United States Patent [19]
Takao et al.

[11] Patent Number: 5,617,009
[45] Date of Patent: Apr. 1, 1997

[54] RECHARGEABLE BATTERY CHARGING CIRCUIT WHICH SETS SUPPLEMENTAL CHARGING CAPACITY ACCORDING TO AMBIENT TEMPERATURE

[75] Inventors: Mitsunori Takao; Toshiharu Kokuga, both of Sumoto; Takanao Matsumoto; Hiroaki Sakurai, both of Itano-gun, all of Japan

[73] Assignee: Sanyo Electric Co., Ltd., Osaka, Japan

[21] Appl. No.: 251,941

[22] Filed: Jun. 1, 1994

[30] Foreign Application Priority Data

Jun. 16, 1993 [JP] Japan .................................. 5-144885

[51] Int. Cl.⁶ .................................................. H01M 10/46
[52] U.S. Cl. ................................ 320/23; 320/31; 320/35
[58] Field of Search ................................ 320/5, 21, 22, 320/23, 31, 32, 35, 36, 39, 40, 48

[56] References Cited

U.S. PATENT DOCUMENTS

| | | | |
|---|---|---|---|
| 4,563,631 | 1/1986 | Mashino et al. ............... | 320/35 X |
| 5,122,722 | 6/1992 | Goedken et al. ............... | 320/22 |
| 5,180,962 | 1/1993 | Giancaterino et al. .......... | 320/35 |
| 5,241,259 | 8/1993 | Patino et al. .................. | 320/35 |
| 5,493,198 | 2/1996 | Kamke ........................... | 320/23 |

FOREIGN PATENT DOCUMENTS 4-121031  4/1992  Japan .

*Primary Examiner*—Edward H. Tso
*Attorney, Agent, or Firm*—Wenderoth Lind & Ponack

[57] ABSTRACT

A battery charging circuit performs rapid charging without over-charging followed by supplementary charging to insure a fully charged rechargeable battery. The amount of supplementary charging is increased at low ambient temperatures and decreased at high temperatures. A primary charging circuit means for rapid charging and a supplementary charging circuit means for supplementary charging are provided. A temperature sensing means measures ambient temperature during rapid charging to establish the amount of supplementary charging required.

15 Claims, 3 Drawing Sheets

RECHARGEABLE BATTERY CHARGING CIRCUIT WHICH SETS SUPPLEMENTAL CHARGING CAPACITY ACCORDING TO AMBIENT TEMPERATURE

BACKGROUND OF THE INVENTION

This invention relates to a rechargeable battery charging circuit, and more particularly to a charging circuit capable of supplementary charging the rechargeable battery as close as possible to full charge.

It is common knowledge that a rechargeable battery is a battery which may be used repeatedly by recharging. When recharging, it is desirable to charge the rechargeable battery, in so far as possible, to its full capacity. A battery which is not fully charged is charge deficient, cannot output its intrinsic capacity, and cannot drive a load for long periods.

On the other hand, if the battery is over-charged, problems such as battery performance degradation and lifetime shortening are invited. Nevertheless, it is difficult to charge a rechargeable battery to its fully charged state without undercharging or over-charging.

In particular, when rapid charging is performed using large charging currents to reduce charging time, it is easy to over-charge the battery. For this reason, a full charge sensor, which detects when the battery reaches full charge and terminates charging, is well known. It has been observed that battery voltage and temperature rise when the rechargeable battery reaches full charge. Hence, the full charge sensor detects battery voltage or temperature rise to determine full charge. However, it is also well known that the effects of the ambient temperature during charging introduce variation in the degree of battery voltage and temperature rise. Consequently, in a system where full charge is determined by detecting when the battery temperature reaches a set value, there is a tendency, when the ambient temperature is low, for the battery to reach full charge without the battery temperature reaching the set value resulting in over-charging. For this reason, it is not uncommon to establish a set temperature value low enough to insure that over-charging will not occur even at low ambient temperatures.

Since the full charge sensor is set in this manner to prevent over-charging under various conditions, the battery cannot fully charge under all conditions. In particular, among rechargeable batteries, the nickel metal hydride battery is weaker with respect to over-charging and more subject to degradation than nickel cadmium and lead storage batteries. Consequently, this property must be considered and charging must be terminated early in the case of rapid charging.

In order to fully charge a rechargeable battery as rapidly as possible without over-charging, a method is known wherein supplemental charging with a very small current is performed after rapid charging close to full charge. For example, In Japanese Non-examined Patent Publication No. 4-121031 issued Apr. 22, 1992 discloses a charging circuit which performs supplementary charging for a fixed period after rapid charging of the rechargeable battery. However, this charging circuit still has the drawback that undercharging and over-charging can occur due to the effects of ambient temperature. This is because the supplementary charging is performed for a fixed period independent of the ambient temperature. As described before, variation in ambient temperature gives rise to variation in the degree of battery voltage and temperature rise at full charge. Therefore, there is also variation in the charge capacity of the battery after termination of rapid charging. Namely, the charge capacity after rapid charging is not a fixed value. For example, if one battery is charged at room temperature and a second battery is charged at a temperature below room temperature, even if the charging capacity is the same, the lower the ambient temperature the lower the output discharge capacity of the second battery. In other words, it is known that the second battery is not fully charged. Consequently, because of charge capacity variation during rapid charging due to ambient temperature effects, supplementary charging for a fixed period as described in the above disclosure has the drawback that the final battery charge varies depending on the ambient temperature.

It is thus an object of the present invention to provide a charging circuit which solves the above mentioned problems by adjusting the supplementary charging capacity according to the ambient temperature, and thereby charge a battery to full charge independent of the ambient temperature.

SUMMARY OF THE INVENTION

The charging circuit of this invention is provided with a primary charging circuit means and a supplementary charging circuit means to perform supplementary charging at the completion of primary charging. The supplementary charging circuit means is provided with a temperature sensing means to detect the ambient temperature of the battery during primary charging and a supplementary charge capacity setting means to establish the supplementary charge capacity according to the ambient temperature detected by the temperature sensing means. In the charging circuit of a preferred embodiment of the present invention, the supplementary charge capacity setting means is composed of a timer Integrated Circuit (IC), and the supplementary charge capacity is adjusted by the supplementary charging time set by the timer IC. Supplementary charging times corresponding to different ambient temperatures are pre-loaded into the memory of the timer IC.

After primary charging by the charging circuit of the present invention, the rechargeable battery is supplementary charged with a charge capacity just corresponding to the ambient temperature. Consequently, supplementary charging is adjusted according to ambient temperature, and the battery can be charged close to full charge without over or under-charging regardless of the ambient temperature during charging.

DETAILED DESCRIPTION OF THE INVENTION

Figure 1:
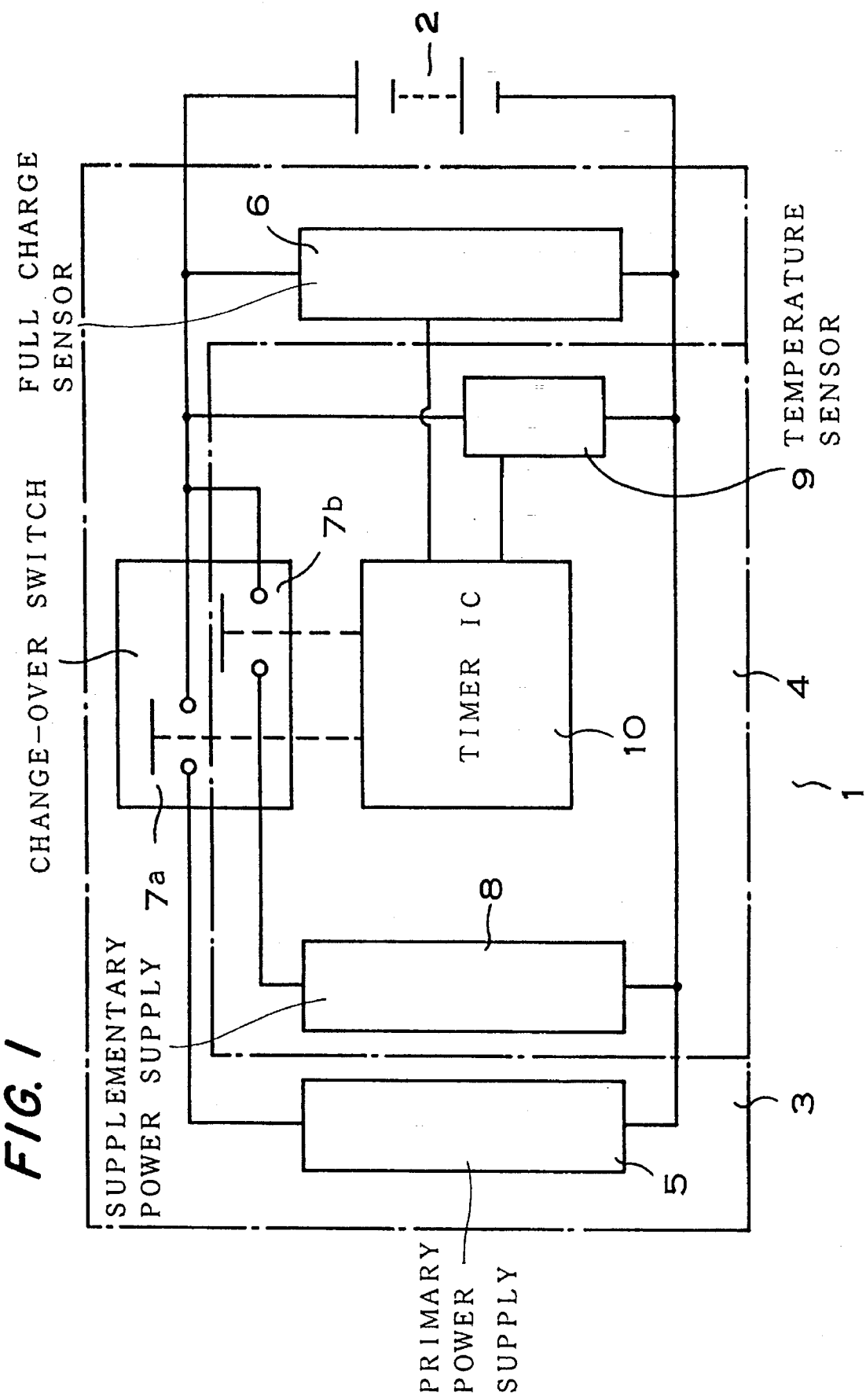
FIG. 1 is a block circuit diagram of the charging circuit of the present invention.

The following describes in detail a preferred embodiment of the present invention based on the drawings. Turning to FIG. 1, a block diagram of the charging circuit of the present invention is shown. In this diagram, 1 is the charging circuit, and 2 is a nickel metal hydride battery used as the battery to be charged by connection to the charging circuit 1. The charging circuit 1 is made up of a primary charging circuit means 3 and a supplementary charging circuit means 4.

The primary charging circuit means 3 is capable of rapid charging at a rate equivalent to the battery capacity of a nickel metal hydride battery 2, for example, in 1 hour. The primary charging circuit means 3 is provided with a primary power supply 5, a full charge sensor 6, and a change-over switch 7a. The full charge sensor 6 monitors nickel metal hydride battery 2 voltage during charging. It has been observed that during charging the nickel metal hydride battery 2 has the property that its voltage begins to rise as charging progresses and then reaches a peak value near full charge. The full charge sensor 6 detects when this peak value of voltage is reached to determine full charge. When the full charge sensor 6 determines that the nickel metal hydride battery 2 is fully charged, the change-over switch 7a is activated to break the circuit connecting the primary power supply 5 and the nickel metal hydride battery 2.

The supplementary charging circuit means 4 is capable of supplementary charging at a rate equivalent to the battery capacity of a nickel metal hydride battery 2, for example, in 10 hrs. The supplementary charging circuit means 4 is provided with a supplementary power supply 8, a temperature sensor 9, a supplementary charge capacity setting means which is a timer IC 10, and a change-over switch 7b. The temperature sensor 9 monitors the ambient temperature at the beginning of rapid charging (primary charging). the charge capacity that can be attained during rapid charging varies depending on ambient temperature. Consequently, it is necessary to set the amount of supplementary charging according to the ambient temperature. The temperature sensor 9 detects the ambient temperature and outputs it to the timer IC 10. The timer IC 10 sets the supplementary charging time corresponding to the ambient temperature. The time expired output signal from the timer IC 10 activates the change-over switch 7b to control the connection between the supplementary power supply 8 and he nickel metal hydride battery 2.

Figure 2:
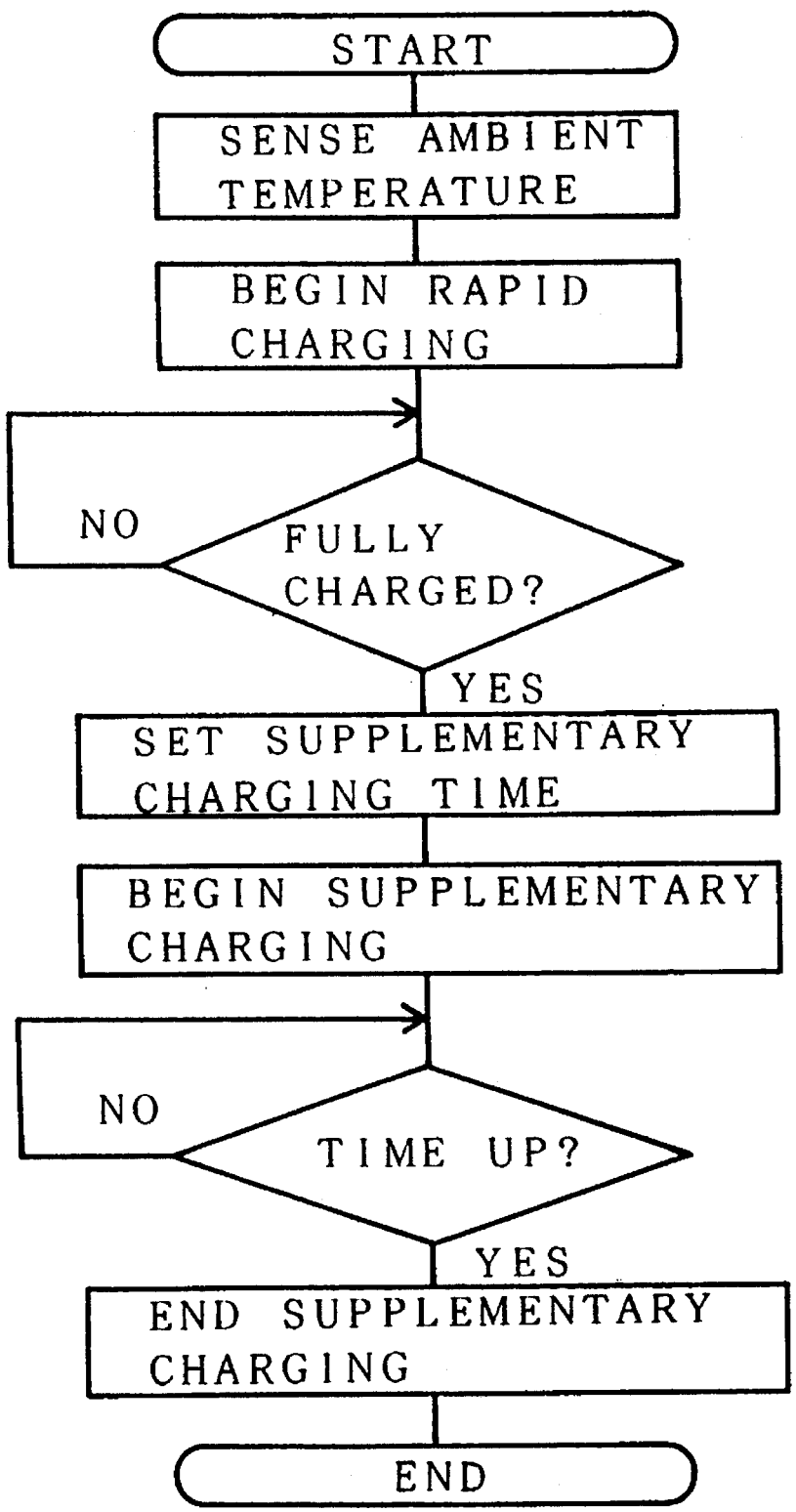
FIG. 2 is a flowchart showing the operation of the circuit of FIG. 1.

Turning to FIG. 2, a flowchart indicating the operation of the circuit of FIG. 1 is shown. Operation according to FIG. 2 is as follows. When charging is started, the temperature sensor 9 detects the ambient temperature and the primary charging circuit means 3 begins rapid charging. At this time the change-over switch 7a is on, and the change-over switch 7b is off. As rapid charging progresses, battery voltage finally rises as full charge is neared. The full charge sensor 6 judges the nickel metal hydride battery 2 to be fully charged by detecting a peak value of battery voltage. When full charge is detected, output signal from the timer IC 10 turns the change-over switch 7a off, and the change-over switch 7b on. This results in a change-over from rapid charging to supplementary charging. On the other hand,, the ambient temperature detected by the temperature sensor 9 is read into the timer IC 10, and the timer IC 10 sets the supplementary charging time according to the ambient temperature. When the supplementary charging time has expired, the time expired output signal from the timer IC 10 opens the change-over switch 7b to end supplementary charging.

Figure 3:
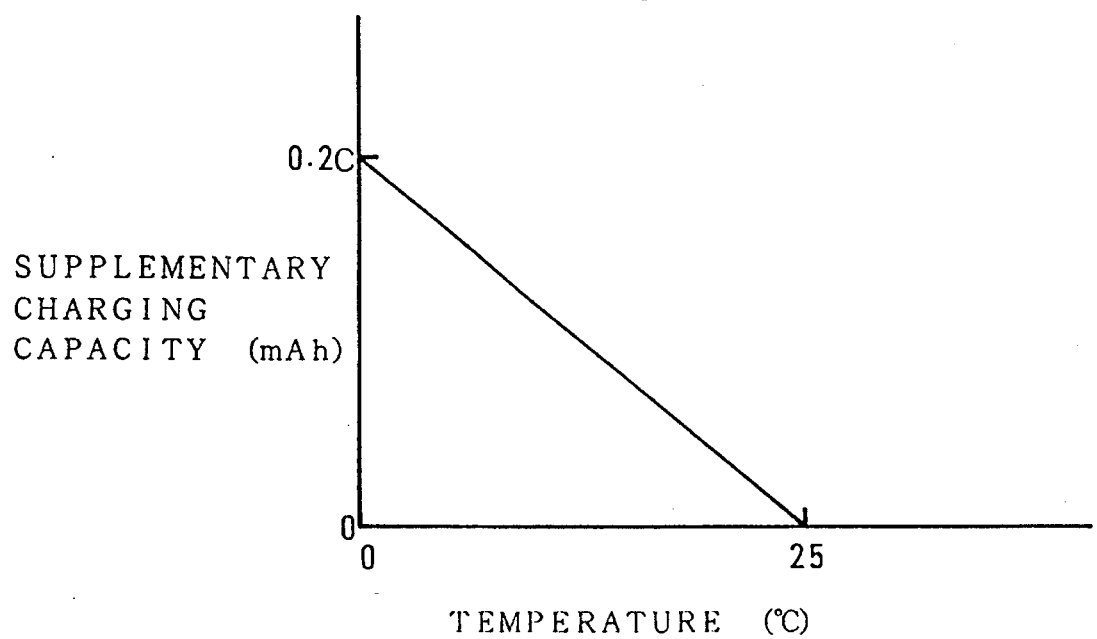
FIG. 3 is graph showing the relation between ambient temperature and supplementary charging capacity.

It should be noted that the time settings corresponding to different ambient temperatures are pre-stored in the timer IC 10. Turning to FIG. 3, a graph of the relation between ambient temperature and supplementary charging capacity is shown. As shown in FIG. 3, when the ambient temperature is 0° C., the supplementary charging capacity is set of 0.2 CmAh. Here, 1C indicates one nominal capacity of the battery being charged. The amount of current delivered by the supplementary power supply 8 during supplementary charging is set to be 0.1 CmA. In other words, when the ambient temperature is 0° C., supplementary charging is performed to give a charging capacity equivalent to two hours of charging at 0.1 CmA. It is also shown in FIG. 3 that the supplementary charging capacity is zero when the ambient temperature is 25° C.

Figure 4:
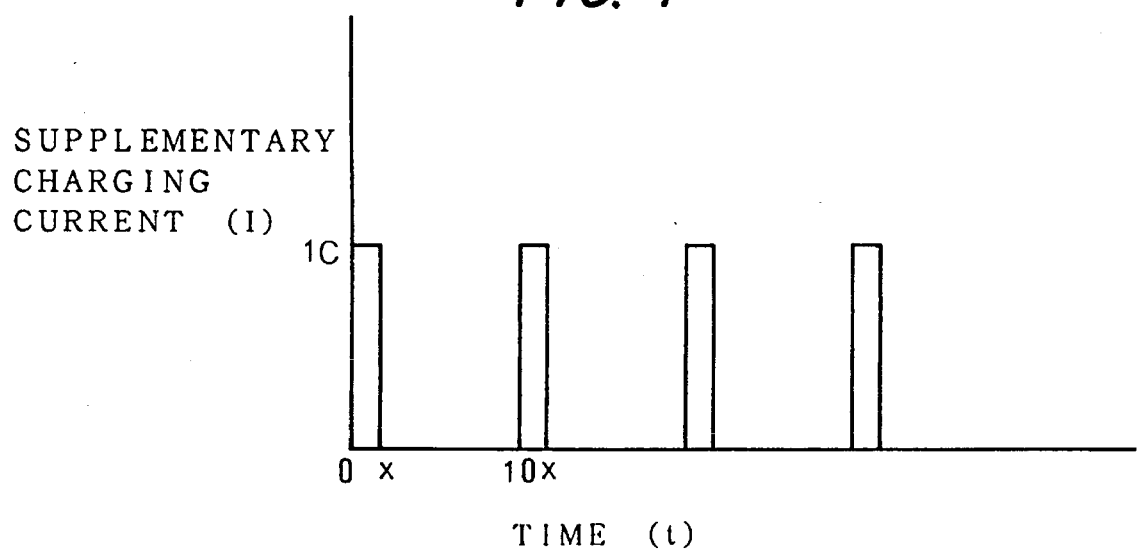
FIG. 4 is graph showing the relation between supplementary charging current and time during supplementary charging.

Turning to FIG. 4, a graph of the relation between charging current and time during supplementary charging is shown. A continuous charging current of 0.1 CmA may be applied during supplementary charging, or pulse charging may be used, as shown in FIG. 4, where 1 CmA is applied for a time period x and charging is suspended for a time period 9x to give an average value of 0.1 CmA. The duty cycle of the pulse can be set without restriction.

During supplementary charging in the present embodiment the charging current is held constant and the charging time is varied to adjust the amount of supplementary charging. However, the supplementary charging capacity can also be adjusted by other means such as varying the amount of charging current according to the ambient temperature.

In addition, although the full charge sensor 6 determines full charge by detecting battery voltage during charging, it is not limited to this action. The full charge sensor 6 may determine full charge by detecting when battery temperature reaches a prescribed value or when the rate of temperature rise reaches a prescribed value during charging. In this case, the temperature sensor 9 may serve the dual unction of full charge detector and temperature sensor for greater circuit structure simplification. Further, the timer 10 can also protect the nickel metal hydride battery 2 from over-charging by operating as a protection timer to forcibly shut down rapid charging in the unexpected case of full charge sensor malfunction and failure to change-over from rapid charging to supplementary charging. Finally, still further circuit structure simplification results if the primary power supply 5 and the supplementary power supply 8 are combined into a single supply which can switch from rapid charging to supplementary charging.

The charging circuit shown in the figures performs primary charging, and then performs supplementary charging at a capacity that just corresponds to the ambient temperature. Therefore, supplementary charging capacity can be adjusted according to the ambient temperature, and the battery can be charged close to full charge without over or under-charging under all ambient temperature conditions. This eliminates concern about insufficient battery charge and allows battery driven equipment to operate for long periods with maximum utilization of the full battery capacity. Furthermore, this eliminates concern about over-charging and prevents the possibility of battery degradation.

What is claimed is:

1. A rechargeable battery charging circuit comprising:

a primary charging circuit means for performing primary charging of the battery; and, a supplementary charging circuit means for performing supplementary charging of the battery at a supplemental charging capacity after completion of the primary charging;

wherein said supplementary charging circuit means includes a temperature sensing means for detecting an ambient temperature of the battery during the primary charging, and a supplementary charge capacity setting means for setting the supplementary charging capacity corresponding to the ambient temperature detected by said temperature sensing means according to a predetermined relation between the supplemental charging capacity and the ambient temperature.

2. A rechargeable battery charging circuit as recited in claim 1, wherein the primary charging circuit means includes a full charge sensor which detects a full charge of the battery being charged, and wherein the primary charging circuit means is responsive to the detection of the full charge to terminate the primary charging.

3. A rechargeable battery charging circuit as recited in claim 2, wherein the full charge sensor detects the full charge by monitoring a voltage of the battery being charged.

4. A rechargeable battery charging circuit as recited in claim 3, wherein the full charge sensor detects the full charge by detecting a peak voltage of the battery being charged.

5. A rechargeable battery charging circuit as recited in claim 1, wherein the battery being charged is a nickel metal hydride battery.

6. A rechargeable battery circuit as recited in claim 1, wherein the primary charging circuit means supplies the battery with a primary charging current that can charge the battery to capacity in 1 hour.

7. A rechargeable battery charging circuit as recited in claim 1, wherein the supplementary charging circuit means supplies the battery with a supplementary charging current that can charge the battery to capacity in 10 hours.

8. A rechargeable battery charging circuit as recited in claim 1, wherein the supplementary charge capacity setting means is a timer.

9. A rechargeable battery charging circuit as recited in claim 1, wherein the supplementary charge capacity setting means is a timer integrated circuit.

10. A rechargeable battery charging circuit as recited in claim 9, wherein the timer integrated circuit includes a memory to store a predetermined relation between supplementary charging times and ambient temperatures.

11. A rechargeable battery charging circuit as recited in claim 1, wherein the supplementary charging capacity set by the supplementary charge capacity setting means is increased at low ambient temperatures and decreased at high ambient temperatures.

12. A rechargeable battery charging circuit as recited in claim 11, wherein the supplementary charging capacity set by the supplementary charge capacity setting means varies linearly with the ambient temperature.

13. A rechargeable battery charging circuit as recited in claim 11, wherein the supplementary charging capacity set by the supplementary charging capacity setting means is set to zero for an ambient temperature of 25° C.

14. A rechargeable battery charging circuit as recited in claim 11, wherein the supplementary charging capacity set by the supplementary charging capacity setting means is set to 0.2° C. for an ambient temperature of 0° C.

15. A rechargeable battery charging circuit as recited in claim 8, wherein the supplementary charging circuit means includes a changeover switch to control the supplementary charging of the battery, and wherein the change-over switch is controlled by the timer such that the switch is turned off to terminate battery charging when the timer times out.

\* \* \* \* \*